United States Patent
Nakagome

(10) Patent No.: US 10,322,541 B2
(45) Date of Patent: Jun. 18, 2019

(54) EMBOSSED SHEET AND DECORATIVE SHEET

(71) Applicant: TOPPAN PRINTING CO., LTD., Tokyo (JP)

(72) Inventor: Tomohiro Nakagome, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 0 days.

(21) Appl. No.: 15/614,378

(22) Filed: Jun. 5, 2017

(65) Prior Publication Data
US 2017/0266866 A1 Sep. 21, 2017

Related U.S. Application Data

(63) Continuation of application No. PCT/JP2015/084700, filed on Dec. 10, 2015.

(30) Foreign Application Priority Data

Dec. 10, 2014 (JP) .................................. 2014-249856

(51) Int. Cl.
B29C 59/02 (2006.01)
B44F 1/04 (2006.01)
(Continued)

(52) U.S. Cl.
CPC ........ B29C 59/022 (2013.01); B29C 37/0053 (2013.01); B29C 59/02 (2013.01);
(Continued)

(58) Field of Classification Search
CPC ... B29C 59/022; B29C 37/0053; B29C 59/02; B29C 59/025; G02F 1/13378;
(Continued)

(56) References Cited

U.S. PATENT DOCUMENTS

2002/0159009 A1 10/2002 Funamoto et al.
2008/0301986 A1 12/2008 Quin
(Continued)

FOREIGN PATENT DOCUMENTS

CN 102292219 A 12/2011
CN 203732746 U 7/2014
(Continued)

OTHER PUBLICATIONS

English language machine trnslation of Tanada (of record, see Information Disclosure Statement dated Sep. 19, 2018) JP2004-219449, 2004.*
(Continued)

*Primary Examiner* — Marin Pichler
(74) *Attorney, Agent, or Firm* — Foley & Lardner LLP

(57) ABSTRACT

An embossed sheet configuring a decorative sheet includes a sheet-shaped base that has translucency, and a plurality of reflective portions provided on one surface of the base. Each of the plurality of reflective portions has a reflective main surface that reflects incident light, and connecting surfaces that are provided between the reflective main surface and the base. Each reflective main surface is rectilinear on a first cross-section and curvilinear on a second cross-section. A gradient of a straight line at a center position of the reflective main surface that is rectilinear on the first cross-section, in relation to the one surface of the base, varies within a range of ±40 degrees in each of the plurality of reflective portions. As a result, the reflective portion can reflect incident light at regular and non-regular angles.

15 Claims, 15 Drawing Sheets

(51) Int. Cl.
*G02F 1/1337* (2006.01)
*B44F 1/06* (2006.01)
*B29C 37/00* (2006.01)
*B41M 1/24* (2006.01)

(52) U.S. Cl.
CPC .............. *B44F 1/045* (2013.01); *B44F 1/066* (2013.01); *G02F 1/13378* (2013.01); *B29C 59/025* (2013.01); *B41M 1/24* (2013.01)

(58) Field of Classification Search
CPC ........... B44F 1/066; B44F 1/045; B41M 1/24; G02B 5/045; G02B 5/126; G02B 5/128; G02B 5/13; G02B 5/136
USPC .......................... 359/834, 454, 455, 459, 530
See application file for complete search history.

(56) References Cited

U.S. PATENT DOCUMENTS

2012/0275010 A1  11/2012  Quin
2015/0043096 A1   2/2015  Quin

FOREIGN PATENT DOCUMENTS

| | | |
|---|---|---|
| JP | S50-092351 A | 7/1975 |
| JP | H08-108512 A | 4/1996 |
| JP | H09-085824 A | 3/1997 |
| JP | H10-287033 A | 10/1998 |
| JP | 2001-009907 A | 1/2001 |
| JP | 2004-219449 A | 8/2004 |
| JP | 3672636 B2 | 7/2005 |
| JP | 2010-208212 A | 9/2010 |

OTHER PUBLICATIONS

International Search Report for International Patent Applicatin No. PCT/JP2015/084700 dated Mar. 15, 2016.
Chinese Office Action dated Jul. 23, 2018 in corresponding application No. 2015800654408.
Extended European Search Report dated Jul. 20, 2018 in corresponding application No. 15868560.
Chinese Office Action dated Jan. 11, 2019 in corresponding application No. 2015800654408.

* cited by examiner

FIRST DIRECTION

EMBOSSED SHEET AND DECORATIVE SHEET

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2015/084700, filed on Dec. 10, 2015, which is based upon and claims the benefit of priority of Japanese Patent Application No. 2014-249856, filed on Dec. 10, 2014, the entireties of which are hereby incorporated by reference.

TECHNICAL FIELD

The present invention relates to an embossed sheet and a decorative sheet. In particular, the present invention relates to an embossed sheet that provides a function for controlling reflected light of lighting and a decorative sheet that is integrated with the embossed sheet.

BACKGROUND

Conventionally, as a decorative board used as a wood surface in interior decoration and furniture, a decorative sheet on which a wood-grain pattern is printed that is laminated onto plywood or the like has often been used. Regarding decorative boards such as this, decorative boards that are excellent in design expressing the texture of wood are proposed. For example, in a decorative board described in PTL 1, excellent design is actualized by a transparent olefin resin-based sheet on which the wood-grain pattern of hardwood is printed being laminated onto softwood that is shaped to be thin and flat.

CITATION LIST

Patent Literature

[PTL 1] Specification of Japanese Patent No. 3672636

SUMMARY OF THE INVENTION

Technical Problem

A natural wood-grain pattern has luster, so-called "teri" in Japanese. "Teri" refers to luster that appears in a direction different from a specular direction when light is incident on natural wood. When an angle of incidence of light and an observation position move, the site at which teri appears also moves. Based on the findings of the present inventors, the movement of the site at which "teri" occurs is anisotropic. This is thought to be attributed to the fibrous form of the cell lumen in natural wood. That is, light incident in an extending direction of the fibrous cell lumina is generally reflected in the specular direction. However, light incident in an array direction of the fibrous cell lumina is reflected such as to be deflected in a direction different from the specular direction because of the angle of the cell lumen. The movement of the site at which "teri" occurs is thought to occur as a result of the angle of the cell lumen changing based on position.

Here, the results of an evaluation of reflection scattering characteristics of a natural wood-grain pattern are shown in FIG. 1. FIG. 1A is a schematic diagram of a wood-grain pattern of natural wood on which the evaluation of reflection scattering characteristics was performed. FIG. 1B is a diagram of the measurement results of the reflection scattering characteristics when illumination light is incident from a Y direction. FIG. 1C is a diagram of the measurement results of the reflection scattering characteristics when illumination light is incident from an X direction. As shown in FIG. 1B, when illumination light is incident from the Y direction, a second reflection peak occurs at an angle different from the regular reflection angle. When the measurement site is changed, the angle at which the second reflection peak occurs changes. Meanwhile, as shown in FIG. 1C, when illumination light is incident from the X direction, only the regular reflection peak that appears at the regular reflection angle occurs. That is, the anisotropic nature of the movement of the site at which teri occurs due to the fibrous cell lumina, described above, was confirmed.

Such teri is one of the characteristics of the luster of natural wood. However, in conventional decorative sheets such as that described above, luster that has "teri" that appears in the wood-grain patterns of natural wood is difficult to reproduce.

The present invention has been achieved to improve or even solve such issues. An object of the present invention is to provide an embossed sheet that is capable of reproducing, at least to an increased degree, luster that has teri that appears in wood-grain patterns of natural wood, and a decorative sheet including the embossed sheet.

Solution to Problem

According to an aspect of an embossed sheet of the present invention, the embossed sheet of the present invention includes a sheet-shaped base that has translucency, and a plurality of reflective portions that are provided on one surface of the base. Each of the plurality of reflective portions has a reflective main surface that reflects incident light and a connecting surface that is provided between the reflective main surface and the base. In the embossed sheet, each reflective main surface includes a rectilinear portion or a curvilinear portion on a first cross-section perpendicular to the one surface, and a rectilinear portion or a curvilinear portion on a second cross-section intersecting with the one surface and the first cross-section. A gradient of a tangent line at a rectilinear or curvilinear portion at a center position of the reflective main surface including the rectilinear portion or the curvilinear portion on the first cross-section in relation to the one surface varies within a range of −40 degrees or more and 40 degrees or less in each of the plurality of reflective portions.

In the embossed sheet, in the plurality of reflective portions provided on the base, each reflective main surface includes a rectilinear or curvilinear portion on the first cross-section. In addition, the gradient of the tangent line at the rectilinear or curvilinear portion at the center position of the reflective main surface in relation to the one surface varies within the range of ±40 degrees in each of the plurality of reflective main surfaces. In this case, as a result of the reflective main surfaces of which the gradient differs, reflected light can be reflected at angles that are different from the regular reflection angle at the one surface of the base. In addition, light is reflected over directions within a suitable angular range. Therefore, for example, when the embossed sheet is applied to a decorative sheet, teri such as that which appears in wood-grain patterns can be reproduced. In addition, because the gradient varies within the range of ±40 degrees, light can also be reflected in directions within an angular range that is often actually visible. Furthermore, each reflective main surface includes the curvilinear portion and the like on the second cross-section. Therefore, scattering-reflected light that does not have a specific reflection peak can be achieved. Moreover, the base has translucency. Therefore, as a result of a printed surface having a wood-grain pattern being arranged on the side of the surface on which the reflective portions are not provided, a realistic wood-grain texture can be expressed. In addition, the printed surface can be protected from degradation. In particular, as a result of the wood-grain pattern of the printed surface and the wood-grain direction of the embossed sheet being aligned, the effect of expressing a realistic wood-grain texture is further enhanced. As a result of the above, when the embossed sheet according to an aspect of the present invention is applied to a decorative sheet, for example, luster that has teri that appears in the wood-grain patterns of natural wood can be more favorably reproduced. Numerous reflective portions (lenses) of which the angle formed by the tangent line at the rectilinear or curvilinear portion at the center position of the reflective main surface and the one surface of the base differs are arranged. Therefore, the reflected light angles can be freely designed based on location.

In the above-described embossed sheet, the connecting surface may be such that a region connecting to the reflective main surface has a circular arc shape on the first cross-section. In this case, light incident on the connecting surface can be scattering-reflected.

In the above-described embossed sheet, the connecting surface may be such that a region connecting to the reflective main surface has a rectilinear shape on the first cross-section. In this case, removal from a mold when the embossed sheet is molded can be improved.

In the above-described embossed sheet, the connecting surface may be provided on only one end side of the reflective main surface on the first cross-section. In this case, illumination light incident on the connecting surface can be reduced, while maintaining the function of the reflective main surface for reproducing teri. The illumination light incident on the connecting surface becomes a factor in causing reflection in a direction different from a designed teri direction, and therefore, is preferably reduced.

In the above-described embossed sheet, each reflective main surface may have a gentle curvilinear shape in which tangent lines at two arbitrary points on the reflective main surface form an angle with each other of 0 degrees or more and 40 degrees or less on the first cross-section. In this case, reflected light can be reflected at angles different from the regular reflection angle at the one surface of the base. In addition, light is reflected over directions within a suitable angular range. Therefore, for example, when the embossed sheet is applied to a decorative sheet, a more natural teri in which glare in a specific direction is suppressed can be reproduced.

In the above-described embossed sheet, the reflective main surface may have a rectilinear shape on the first cross-section and a curvilinear shape on the second cross-section. In this case, light incident in a direction along the first cross-section can be reflected in a direction different from the regular reflection angle. In addition, light incident in a direction along the second cross-section can become scattering-reflected light that does not have a reflection peak. When the embossed sheet is applied to a decorative sheet, a more natural teri in which glare in a specific direction is suppressed can be more easily reproduced.

In the above-described embossed sheet, a total area ratio occupied by the reflective main surfaces in relation to the one surface of the base may be 1% or more and 70% or less. In this case, luster that has teri that appears in the wood-grain patterns of natural wood can be more easily reproduced.

In the above-described embossed sheet, the gradient may be such that a transition of angle along an array of the plurality of reflective portions in a direction parallel to the first cross-section is greater in variation than a transition of angle along an array of the plurality of reflective portions in a direction parallel to the second cross-section. In this case, the reflection of light can be given anisotropy by the array of the reflective portions. Therefore, the anisotropy of scattering reflection can be expressed in the form of a line or a band.

In addition, the gradient may be such that the transition of angle along the array of the plurality of reflective portions in the direction parallel to the first cross-section is cyclic. In this case, light is reflected over directions within a suitable angular range by the reflective main surfaces of which the angle of gradient cyclically transitions. Therefore, luster having teri that appears in the wood-grain patterns of natural wood can be more reproduced.

In addition, in the above-described embossed sheet, the gradient may be such that a transition of angle along an array of the plurality of reflective portions in a direction parallel to the second cross-section is greater in variation than a transition of angle along an array of the plurality of reflective portions in a direction parallel to the first cross-section. In this case, the reflection of light can be given anisotropy by the array of the reflective portions. Therefore, the anisotropy of scattering reflection can be expressed in the form of a line or a band.

In addition, the gradient may be such that the transition of angle along the array of the plurality of reflective portions in the direction parallel to the second cross-section is cyclic. In this case, light is reflected over directions within a suitable angular range by the reflective main surfaces of which the angle of gradient cyclically transitions. Therefore, luster having teri that appears in the wood-grain patterns of natural wood can be more reproduced.

In the above-described embossed sheet, a plurality of areas may be provided in which the plurality of reflective portions are provided such that the angle of the gradient and a cycle at which the angle of the gradient transitions differ from each other. In this case, an area in which the reflected light is to be strongly expressed and an area in which the reflected light is to be weakly expressed can be set. Therefore, luster that has teri that appears in the wood-grain patterns of natural wood can be more reproduced In the above-described embossed sheet, a surface roughness Ra of at least either of the surfaces of the plurality of reflective portions and the one surface may be 0.01 μm or more and 20 μm or less. In this case, suitable scattering characteristics can be obtained, while reflecting light over directions within a suitable angular range. In the above-described embossed sheet, the plurality of reflective portions may have a protruding shape or a recessed shape.

According to another aspect, the present invention relates to a decorative sheet. The decorative sheet is configured to include any of the above-described embossed sheets. In the decorative sheet, the above-described working effects can be favorably actualized.

Effects of the Invention

In the present invention, luster that has teri that appears in the wood-grain patterns of natural wood can be reproduced.

DESCRIPTION OF REPRESENTATIVE EMBODIMENTS

Figure 1A:
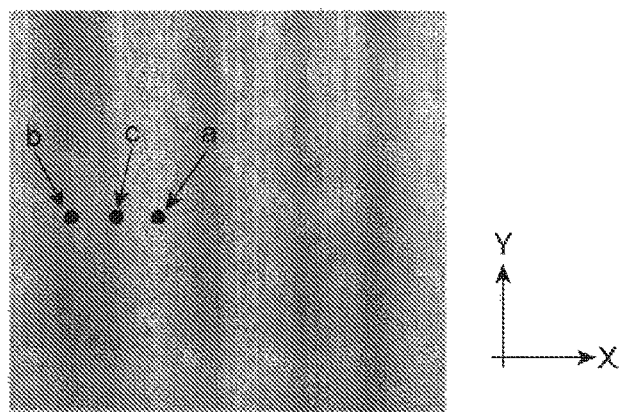
FIG. 1A is a schematic diagram of a wood-grain pattern of natural wood on which an evaluation of reflection scattering characteristics is performed.

An embodiment of an embossed sheet and a decorative sheet including the embossed sheet of the present invention will hereinafter be described in detail with reference to the drawings. In the description, identical reference numbers may be used for identical elements or elements providing identical functions. Redundant descriptions are omitted. In addition, for ease of description, the description is given such that a direction corresponding to a left/right direction in a top view of the embossed sheet in the drawings is referred to as a first direction, and a direction corresponding to an up/down direction is referred to as a second direction. Finally, it is to be understood that the representative embodiments discussed below are meant to be illustrative of the present invention and that the representative embodiments are not necessarily limited to these embodiments.

Figure 2:
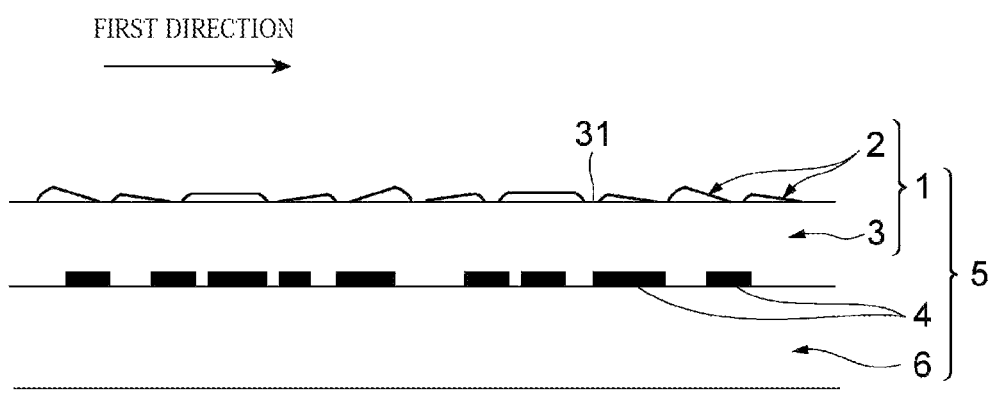
FIG. 2 is a schematic diagram of a decorative sheet according to the present embodiment.
Figure 3:
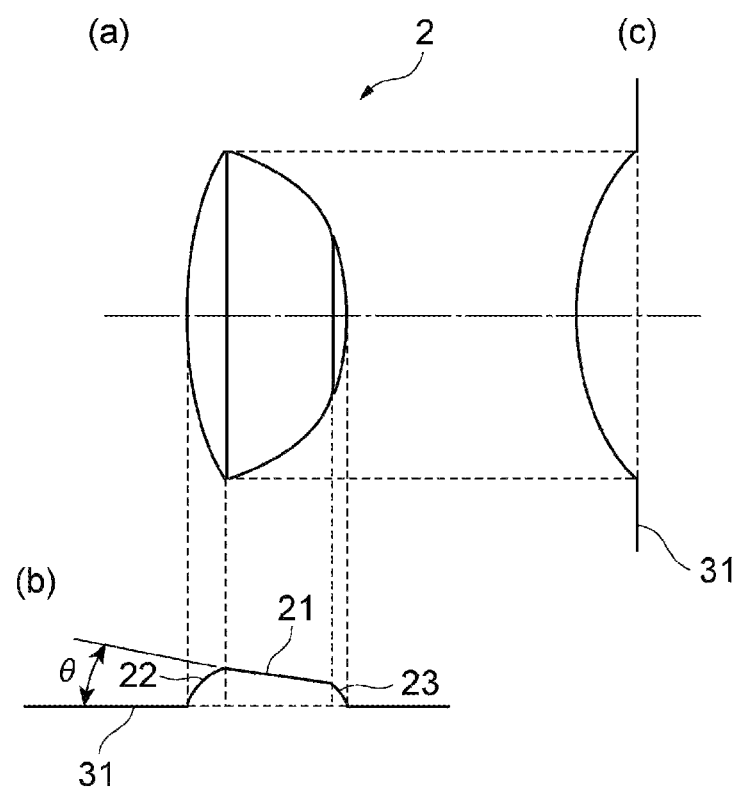
FIG. 3 is a schematic diagram of an example of a reflective portion according to the present embodiment.

FIG. 2 is a schematic diagram of a cross-sectional configuration of a decorative sheet according to the present embodiment. FIG. 3 is a schematic diagram of a reflective portion of an embossed sheet configuring the decorative sheet shown in FIG. 2. A decorative sheet 5 is used as a surface wood in interior decoration and furniture by being laminated onto plywood or the like. As shown in FIG. 2, the decorative sheet 5 is configured to include a sheet-shaped lower layer base 6, a printed surface having a wood-grain pattern that is provided above the lower layer base 6, and an embossed sheet 1. The embossed sheet 1 is arranged above the lower layer base 6 such that the printed surface 4 is sandwiched between the embossed sheet 1 and the lower layer base 6. The material of the lower layer base 6 is not particularly limited. For example, thermoplastic resin can be used. An example of a suitable material for the lower layer base 6 is polypropylene (PP) random copolymers and high-density polyethylene (HDPE). An organic or inorganic pigment may be added to these thermoplastic resins.

As ink used in the printed surface 4, for example, a urethane resin binder to which an organic or inorganic pigment is added can be favorably used. However, the ink is not limited thereto. An adhesive layer (not shown) may be added to the interface (printed surface 4) between the lower layer base 6 and the embossed sheet 1 of the decorative sheet 5. As the adhesive layer, for example, a polypropylene-based adhesive resin can be used. However, the adhesive layer is not limited thereto and can be selected as appropriate, taking into consideration adhesion between the lower layer base 6 and the embossed sheet 1 of the decorative sheet 5, and the like. In addition, an anchor layer in which an isocyanate is mixed with a polyester polyol may be added between the lower layer base 6 and the adhesive layer of the decorative sheet 5.

Next, the embossed sheet 1 used in the decorative sheet 5 will be described in further detail.

As shown in FIG. 2 and FIG. 3, the embossed sheet 1 according to the present embodiment is configured to include a sheet-shaped base 3 that has translucency, and a plurality of reflective portions 2 provided on one surface 31 of the base 3. In FIG. 3, a top view (a), and two cross-sectional views ((b) and (c)) respectively taken along the first direction and the second direction are shown for a single reflective portion 2 among the plurality of reflective portions 2 that are arranged. Here, the first direction is the left/right direction and the second direction is the up/down direction in the top view in (a) of FIG. 3. This similarly applies to other drawings. In addition, as shown in (b) of FIG. 3, a first cross-section is a cross-section that intersects with the one surface 31 of the base 3. According to the present embodiment, in particular, the first cross-section is a cross-sectional shape on a plane that is perpendicular to the one surface 31 of the base 3 and includes the first direction. As shown in (c) of FIG. 3, a second cross-section is a cross-section that intersects with the one surface 31 of the base 3 and the first cross-section. According to the present embodiment, in particular, the second cross-section is a cross-sectional shape on a plane that is perpendicular to the one surface 31 of the base 3 and includes the second direction perpendicular to the first direction.

As shown in (a) and (b) of FIG. 3, each of the plurality of reflective portions 2 has a reflective main surface 21 and connecting surfaces 22 and 23. The reflective main surface 21 is rectilinearly formed on the first cross-section and reflects incident light. The connecting surfaces 22 and 23 are provided between the reflective main surface 21 and the base 3. The connecting surfaces 22 and 23 connect the reflective main surface 21 and the one surface 31 of the base 3 such that regions connecting with the reflective main surface 21 are formed into a circular arc. As a result of the circular-arc regions being provided on the connecting surfaces 22 and 23 in this way, light incident on the connecting surfaces 22 and 23, of light incident on the embossed sheet 1 from the first direction, can be scattering-reflected.

Meanwhile, as shown in (c) of FIG. 3, the overall reflective portion 2 has a curvilinear shape on the second cross-section. As a result of a configuration such as this, the reflective portion 2 can scattering-reflect light incident on the embossed sheet 1 from the second direction. In the drawings, the reflective portion 2 is shown having a protruding shape. However, the reflective portion 2 may have a recessed shape.

In the reflective portion 2, the widths of the first cross-section and the second cross-section are preferably 10 µm or more and 1 mm or less, and more preferably 50 µm or more and 500 µm or less. A reason for this is that, when the width is less than 10 µm, the reflective portion 2 iridescently shines as a result of the effects of diffracted light. When the width exceeds 1 mm, each reflective portion 2 becomes more easily visible to the human eye.

Figure 1B:
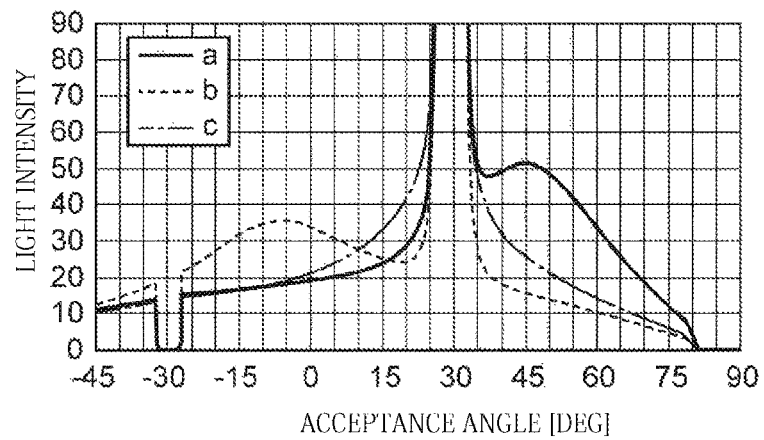
FIG. 1B is a diagram of measurement results of the reflection scattering characteristics when illumination light is incident from a Y direction.

In addition, as shown in (b) of FIG. 3, a rectilinear portion in a center position of the rectilinear reflective main surface 21 is tilted, on the first cross-section, such that a gradient angle θ formed with the one surface 31 of the base 3 is within a range of ±40 degrees. The gradient angle θ varies within the range of ±40 degrees in each of the plurality of reflective portions 2. In some of the reflective portions 2 among the plurality of reflective portions 2, the rectilinear portion of the reflective main surface 21 may be parallel to the one surface 31 of the base 3. When light is incident on the embossed sheet 1 that includes such reflective portions 2, the incident light, such as illumination light, is mainly reflected by the one surface 31 of the base 3 and the reflective main surface 21 of the reflective portion 2. Because the reflective portions 2 are arranged such that a slope angle θ of the reflective main surface 21 varies within the range of ±40 degrees (including 0 degrees) in this way, reflected light (second reflection peak; see FIG. 1B) in a direction different from the regular reflected light reflected by the one surface 31 of the base 3 is generated. The gradient is such that, for example, the angle θ transitions along the array of the plurality of reflective portions 2.

Regarding the intensity of the second reflection peak, the intensity can be adjusted as appropriate by an area ratio of the reflective portions 2 in the embossed sheet 1 being adjusted. Here, the area ratio of the reflective portions 2 is the area of the reflective main surfaces 21 of the reflective portions 2 per unit area of the one surface 31 in the embossed sheet 1. The area ratio of the reflective portions 2 can be arbitrarily set. However, the area ratio of the reflective portions 2 is preferably within a range of 1% or more and 70% or less. A reason for this is that, when the area ratio of the reflective portions 2 is less than 1%, the area of the reflective main surfaces 21 decreases and the second reflection peak becomes weak. In addition, as a result of the arrangement of the reflective portions 2 becoming sparse, the reflective portions 2 become visible as individual dots. Meanwhile, when the area ratio of the reflective portions 2 exceeds 70%, the area of the flat portion of the first surface 31 of the base 3 decreases. Most of the reflected light from the embossed sheet 1 becomes that from the reflective portions 2. The amount of regular reflected light decreases and is unfavorable.

In this way, the area ratio of the reflective portions 2 in the embossed sheet 1 is preferably set within the range of 1% or more and 70% or less. The area ratio of the reflective portions 2 within the one surface 31 of the base 3 may be fixed. However, the area ratio of the reflective portions 2 may be varied (density distribution) based on location. That is, in cases in which strong and weak second reflection peaks are to be expressed within the embossed sheet 1, for example, the area ratio of the reflective portions 2 can be set to be low, within a range of 1% to 20%, in an area in which the second reflection peak is to be weak. The area ratio can be set to be high, within a range of 50% to 70%, in an area in which the second reflection peak is to be strong. The area ratio of an intermediate area can be set within a range of 20% to 50%.

As a method for scattering-reflecting light incident on the embossed sheet 1, at least either surface of the one surface 31 of the base 3 and the reflective portions 2 may be roughened. A rough surface may be transferred by using a roughened mold when the embossed sheet 1 is molded. Alternatively, the embossed sheet 1 may be directly roughened. In addition, a coating containing microparticles may be applied. At this time, a surface roughness Ra is preferably within a range of 0.01 µm or more and 20 µm or less. A reason for this is that the surface roughness Ra of 0.01 µm or less can be considered a substantially specular surface, and the desired scattering characteristics cannot be achieved. Meanwhile, when the surface roughness Ra exceeds 20 µm, the functions of the reflective portions 2 decrease. That is, when the surface roughness Ra of at least either surface of the surfaces of plurality of reflective portions 2 and the one surface 31 is 0.01 µm or more and 20 µm or less, favorable scattering characteristics can be achieved while reflecting light along directions within a suitable angular range. In the embossed sheet 1 such as this, as described hereafter, the reflective portions 2 and the base 3 may be integrally formed from polyethylene terephthalate (PET) or the like. Alternatively, the reflective portions 2 and the base 3 may be separately formed.

[First Variation Example]

Figure 4:
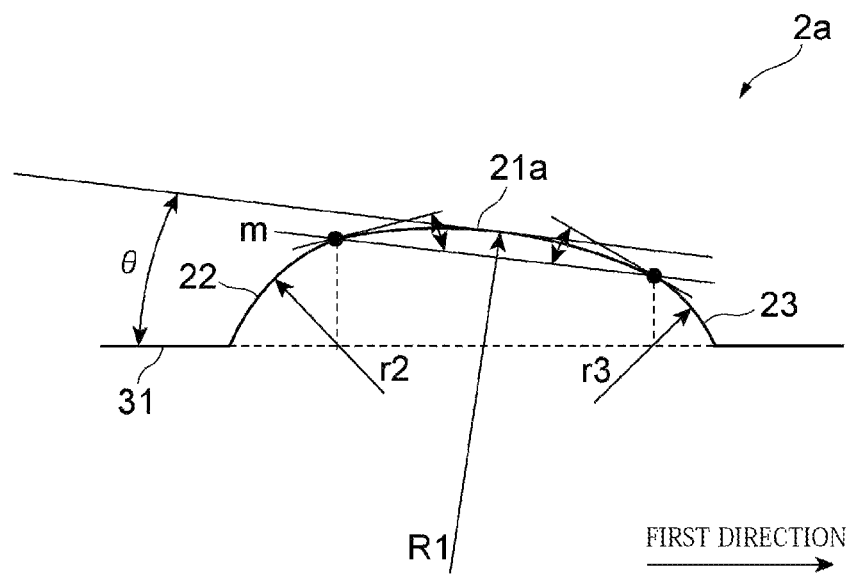
FIG. 4 is a schematic diagram of a reflective portion of a first variation example.

Here, a variation example of the reflective portion 2 used in the embossed sheet 1 will be described. As shown in FIG. 4, the first variation example differs in that a reflective main surface 21*a* is curved on the first cross-section. FIG. 4 is a schematic diagram of the reflective portion of the first variation example. As shown in FIG. 4, a reflective portion 2*a* is composed of the reflective main surface 21*a*, the connecting surface 22, and the connecting surface 23. The reflective main surface 21*a* is curved at a radius R1. The connecting surface 22 that is curved at a radius r2 that is smaller than R1. The connecting surface 23 is curved at a radius r3. Here, the magnitudes of the radii r2 and r3 may be identical or different.

Figure 1C:
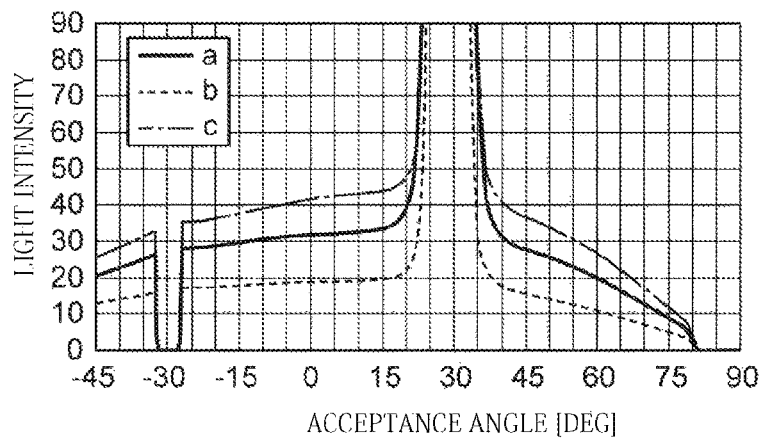
FIG. 1C is a diagram of measurement results of the reflection scattering characteristics when illumination light is incident from an X direction.

When the reflective main surface 21 is a straight line, the width of the second reflection peak tends to become narrow. However, in natural wood, the second reflection peak has a certain amount of angular range. Therefore, the reflective main surface 21 is more preferably curved as in the first variation example, rather than being a completely straight line (see FIGS. 1A-1C). In the first variation example, on the first cross-section, the reflective main surface 21*a* forms a gentle curvilinear shape in which tangent lines at two arbitrary points on the reflective main surface 21*a* form an angle of 0 degrees or more and 40 degrees or less. In addition, angles formed by a straight line m connecting two end points of the reflective main surface 21*a* and tangent lines at the two end points of the reflective main surface 21*a* may be 20 degrees or less. A reason for this is that, when the radius of curvature of the reflective main surface 21*a* is too small, the change in the angle formed between the reflective main surface 21*a* and the one surface 31 of the base 3 becomes meaningless.

In addition, in the reflective portion 2*a* of the first variation example, the gradient angle θ formed by a tangent line at the curved portion in the center position of the curvilinear reflective main surface 21*a* and the one surface 31 of the base 3 is within the range of ±40 degrees, and varies within this range in each reflective portion 2*a*. As a result, in a manner similar to the reflective portions 2, the second reflection peaks can be generated in relation to the regular reflection peak by the one surface 31 of the base 3. In addition, as a result of reflection being achieved within such a range, light can also be reflected in directions of an angular range that is often actually visible.

[Second Variation Example]

Figure 5:
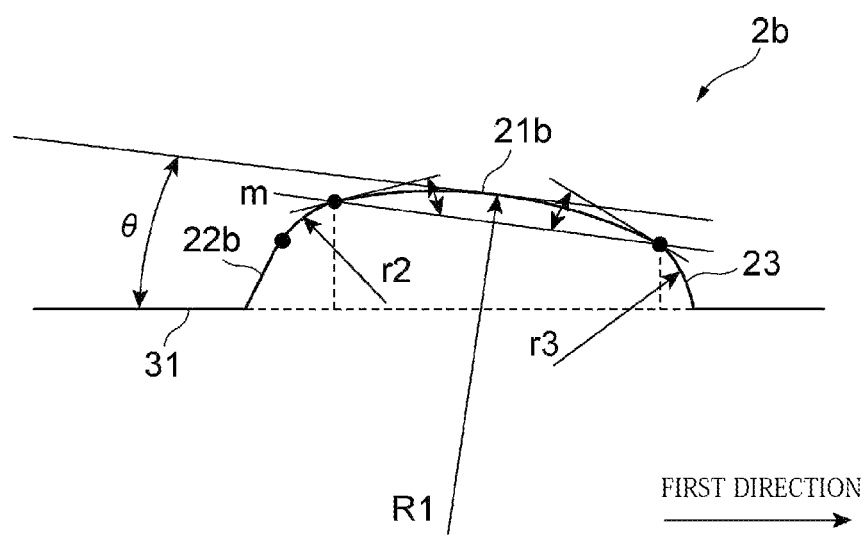
FIG. 5 is a schematic diagram of a reflective portion of a second variation example.

Next, a second variation example of the reflective portion will be described. As shown in FIG. 5, the second variation example differs from the first variation example in that, on the first cross-section, a region of a connecting surface 22*b* on the side connecting to the one surface 31 of the base 3 is rectilinear. Other shapes are similar to those in the first variation example. FIG. 5 is a schematic diagram of the reflective portion of the second variation example. As shown in FIG. 5, a reflective portion 2*b* is composed of a reflective main surface 21*b*, the connecting surface 22*b*, and a connecting surface 23. The reflective main surface 21*b* is curved at the radius R1. The connecting surface 22*b* is such that a region connecting to the reflective main surface 21*b* forms a circular arc shape that is curved at the radius r2 that is smaller than R1. The connecting surface 23 is curved at the radius r3. The connecting surface 22*b* is such that the region connecting to the one surface 31 of the base 3 forms a rectilinear shape. In this case, removal from a mold when the embossed sheet 1 is molded can be improved. The reflective main surface 21*b* is similar to the reflective main surface 21*a* of the first variation example.

[Third Variation Example]

Figure 6:
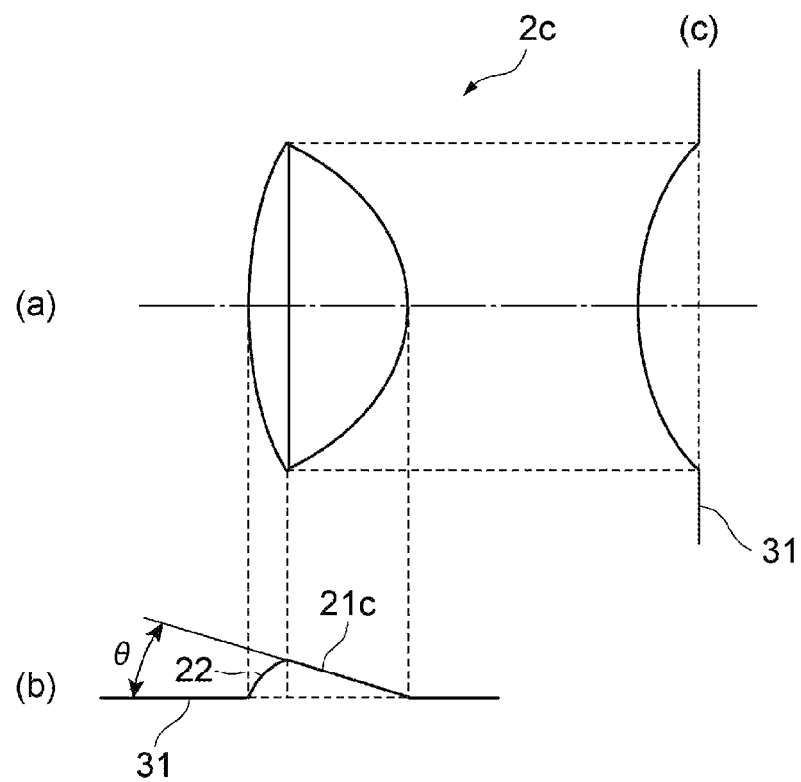
FIG. 6 is a schematic diagram of a reflective portion of a third variation example.

Next, a third variation example of the reflective portion will be described. As shown in FIG. 6, the third variation example differs from the other examples in that, on the first cross-section, the connecting surface 22 is provided only on one end side of a reflective main surface 21*c* and the connecting surface on the other end side is omitted. FIG. 6 is a schematic diagram of the reflective portion of the third variation example. As shown in FIG. 6, in a reflective portion 2*c*, the other end side of the reflective main surface 21*c* is directly connected to the one surface 31 of the base 3 and the connecting surface 23 is omitted. In this case, illumination light incident on the connecting surfaces 22 and 23 can be reduced as a result of either of the connecting surfaces 22 and 23 being omitted, while maintaining the function of the reflective main surface 21*c* for reproducing teri by generating the second peak. The illumination light incident on the connecting surfaces 22 and 23 becomes a factor in causing reflection in a direction different from a designed teri direction, and therefore, is preferably reduced. However, of course, the connecting surfaces 22 and 23 cannot be omitted in cases in which the reflective main surface 21*c* is a straight line and the angle θ formed by the reflective main surface 21*c* and the one surface 31 of the base 3 is 0 degrees. However, the slope angle θ of the reflective main surface 21*c* and the like are otherwise similar to that of the reflective main surface 21 of the reflective portion 2. In a manner similar to the reflective main surface 21, the gradient angle θ of the reflective main surface 21*c* varies within the range of ±40 degrees.

[Fourth Variation Example]

Figure 7:
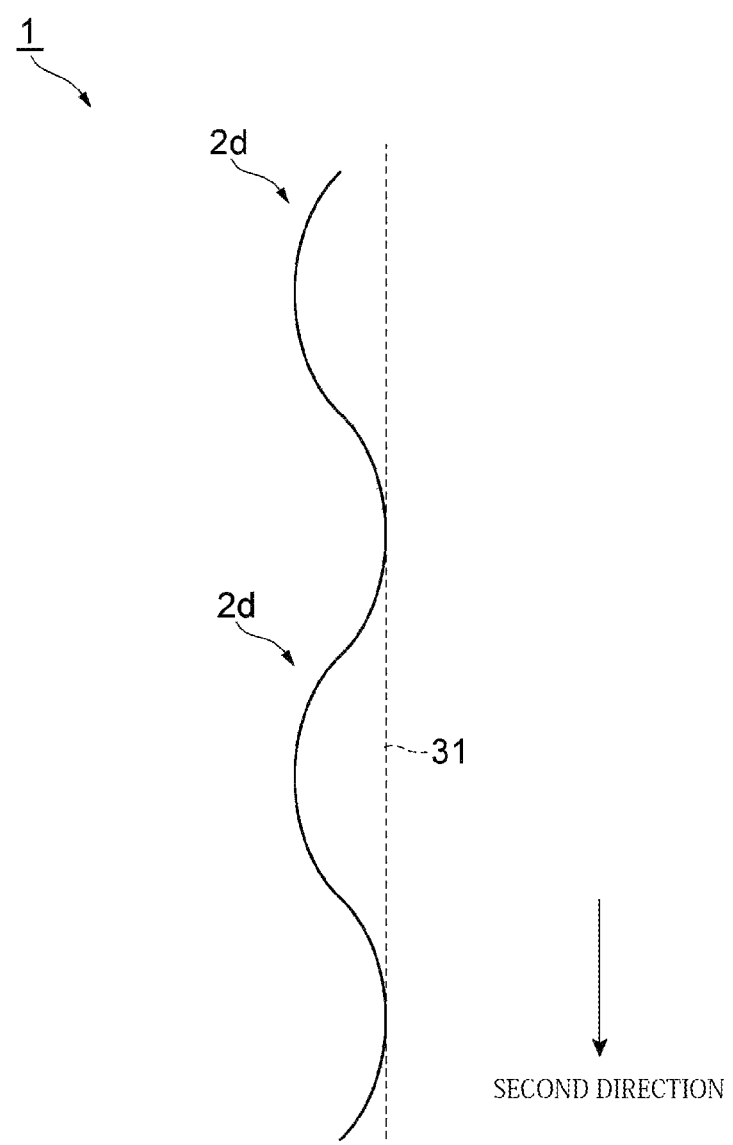
FIG. 7 is a schematic diagram of reflective portions of a fourth variation example.

Next, a fourth variation example of the reflective portion will be described. As shown in FIG. 7, the fourth variation example differs in that reflective portions 2*d* form a wavy line shape. FIG. 7 is a schematic diagram of the reflective portions of the fourth variation example. As shown in FIG. 7, two or more reflective portions 2*d* are cyclically repeated in the wavy line shape. Therefore, light incident on the embossed sheet 1 from the second direction is scattering-reflected by the wavy line-shaped reflective portions 2*d*. In the fourth variation example, the first cross-section of the reflective portion 2*d* is similar to that of the reflective portion 2. However, the first cross-section of the reflective portion 2*d* may be similar to any of the reflective portions 2*a*, 2*b*, and 2*c*.

[Fifth Variation Example]

Figure 8:
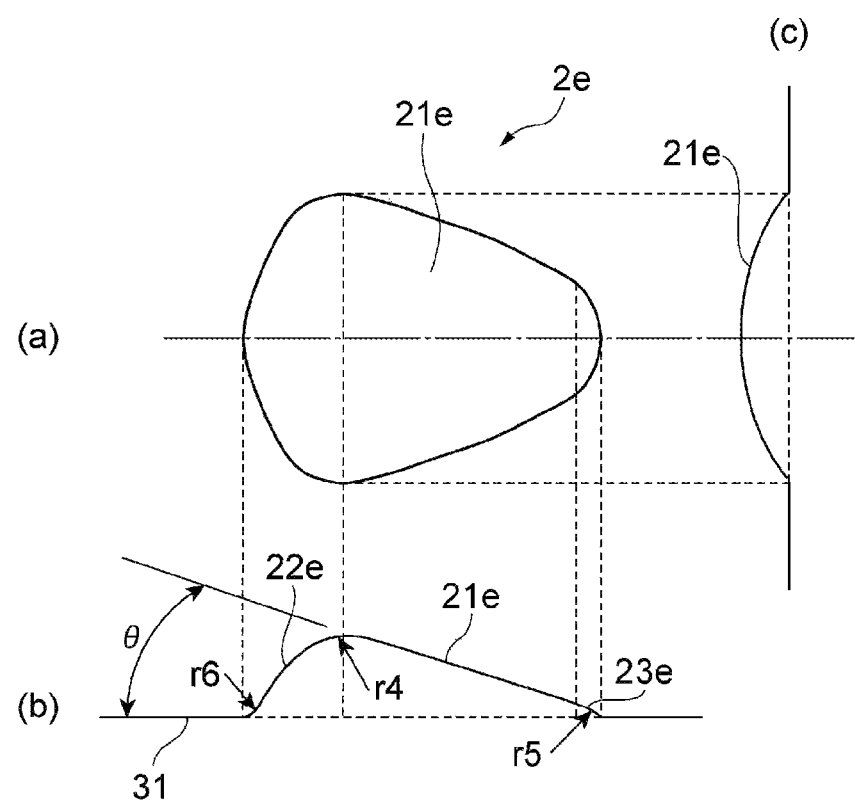
FIG. 8 is a schematic diagram of a reflective portion of a fifth variation example.

Next, a fifth variation example of the reflective portion will be described. As shown in (b) of FIG. 8, the fifth variation example differs from, for example, the third variation example in that, on the first cross-section, a connecting surface 22*e* is provided on one end side of a reflective main surface 21*e*, and a connecting surface 23*e* that is a miniscule circular arc is provided on the other end side of the reflective main surface 21*e*. (a) to (c) of FIG. 8 are schematic diagrams of the reflective portion of the fifth variation example. As shown in FIG. 8, on the first cross-section, the reflective main surface 21*e* is connected on one end side to the connecting surface 22*e* by a portion that is curved at a radius r4, and connected on the other end side to the one surface 31 of the base 3 by the connecting surface 23*e* that is configured to have a miniscule radius r5. In a manner similar to the reflective main surface 21, the gradient angle θ of the reflective main surface 21*e* varies within the range of ±40 degrees. In this case, the connecting surface 23*e* is shaped such as to be substantially omitted and the illumination light incident on the connecting surface 23*e* can be reduced, while maintaining the function of the reflective main surface 21*e* for reproducing teri by generating the second peak. The connecting surface 22*e* is connected to the one surface 31 of the base 3 by a portion that is curved at a miniscule radius r6. In addition, unlike the reflective main surface 21*c* of the third variation example, the reflective main surface 21*e* of a reflective portion 2*e* of the fifth variation example has a planar shape of which the direction along the first cross-section is a long axis and the direction along the second cross-section is a short axis. The shape of the reflective main surface 21*e* along the second cross-section is similar to the reflective main surface 21*c* of the third variation example.

[Sixth Variation Example]

Figure 9:
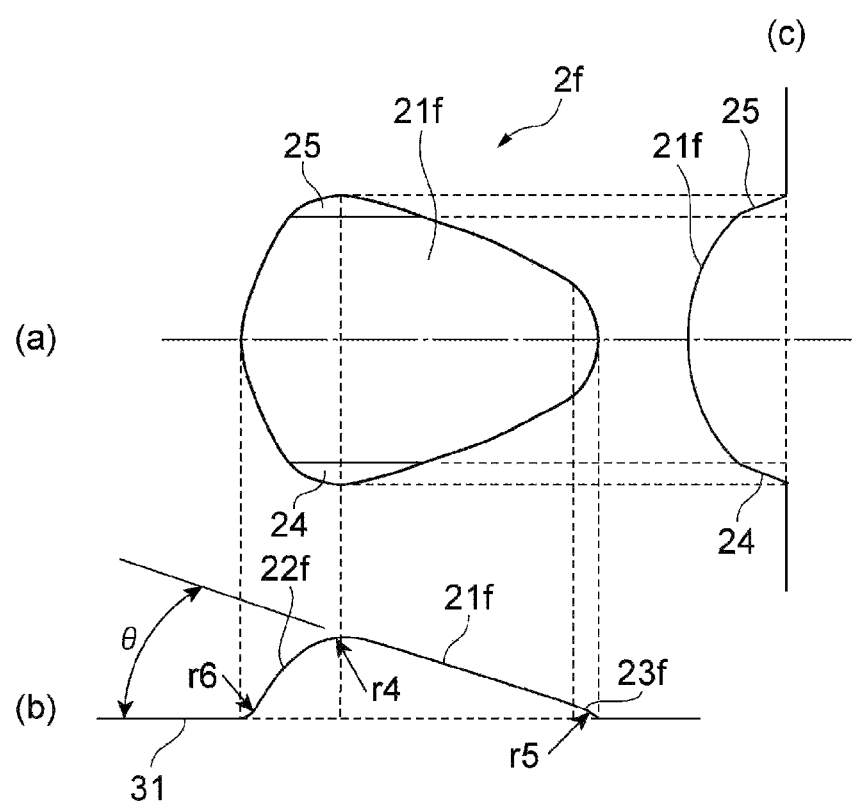
FIG. 9 is a schematic diagram of a reflective portion of a sixth variation example.

Next, a sixth variation example of the reflective portion will be described. As shown in FIG. 9, the sixth variation example differs from, for example, the fifth variation example in that, on the second cross-section, connecting surfaces 24 and 25 are provided on both ends of a reflective main surface 21*f*. Other configurations are similar to those of the fifth variation example and the like. FIG. 9 is a schematic diagram of the reflective portion of the sixth variation example. As shown in FIG. 9, in a reflective portion 2*f*, the connecting surfaces 24 and 25 are provided on both ends of the reflective main surface 21*f* in the second direction. The connecting surfaces 24 and 25 are connected to the one surface 31. In FIG. 9, the connecting surfaces 24 and 25 are straight lines but may be curvilinear. However, the connecting surfaces 24 and 25 may be curvilinear. The reflective main surface 21*f*, and the connecting surfaces 22*f* and 23*f* on the first cross-section correspond to the reflective main surface 21*e*, and the connecting surfaces 22*e* and 23*e* of the reflective portion 2*e* of the fifth variation example and are substantially identical in shape.

[Seventh Variation Example]

Figure 10:
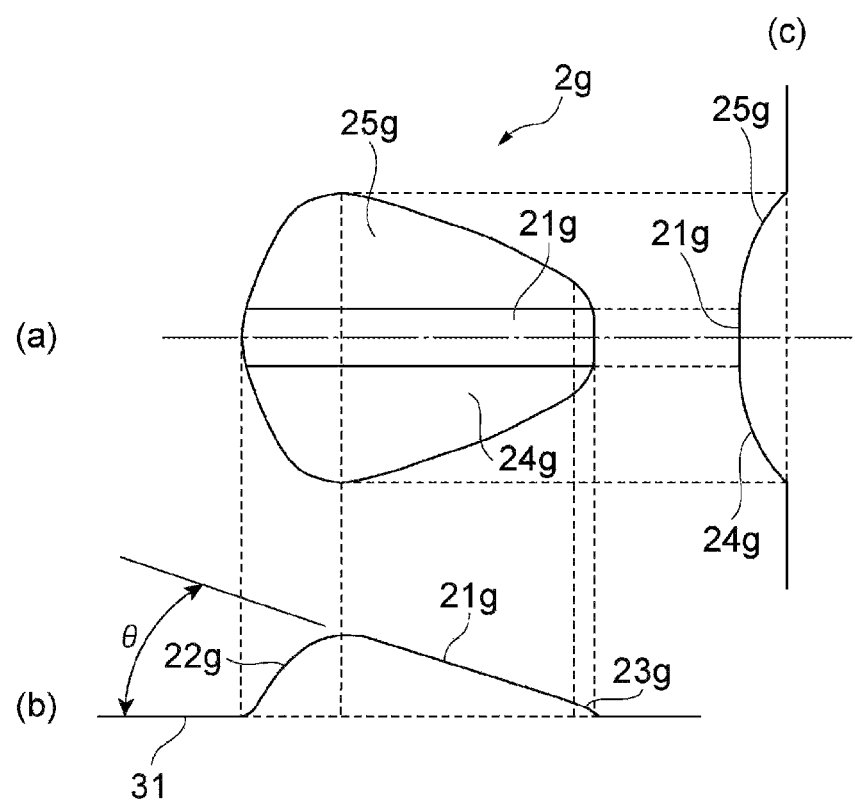
FIG. 10 is a schematic diagram of a reflective portion of a seventh variation example.

Next, a seventh variation example of the reflective portion will be described. As shown in FIG. 10, the seventh variation example differs from, for example, the fifth variation example in that connecting surfaces 24*g* and 25*g* are provided on both ends of a reflective main surface 21*f*, and the reflective main surface 21*f* positioned therebetween is rectilinear. Other configurations are similar to those of the fifth variation example and the like. FIG. 10 is a schematic diagram of the reflective portion of the seventh variation example. As shown in FIG. 10, in a reflective portion 2g, the connecting surfaces 24g and 25g composed of gentle curves are provided on both ends of the rectilinear reflective main surface 21g in the second direction. The connecting surfaces 24g and 25g are connected to the one surface 31. In FIG. 9, the connecting surfaces 24g and 25g are curvilinear. However, the connecting surfaces 24g and 25g may be rectilinear. The reflective main surface 21g and the connecting surfaces 22g and 23g on the first cross-section correspond to the reflective main surface 21e and the connecting surfaces 22e and 23e of the reflective portion 2e of the fifth variation example, and are substantially identical in shape.

[Eighth Variation Example]

Figure 11A:
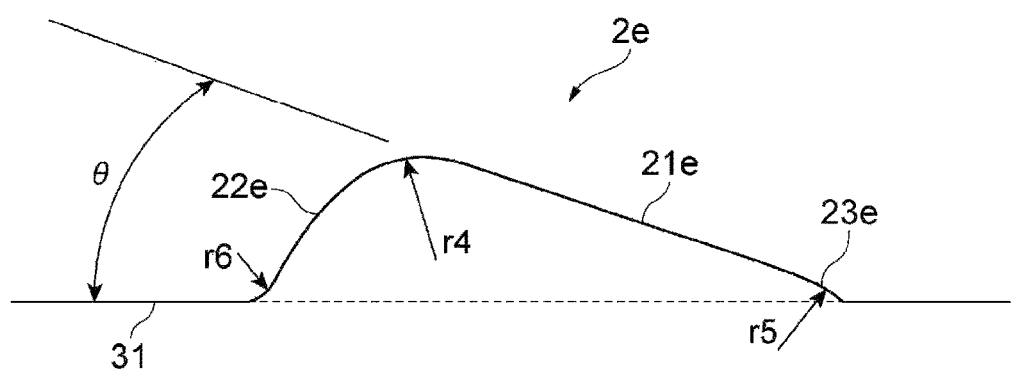
FIGS. 11A-11B are schematic diagrams of a reflective portion of an eighth variation example.
Figure 11B:
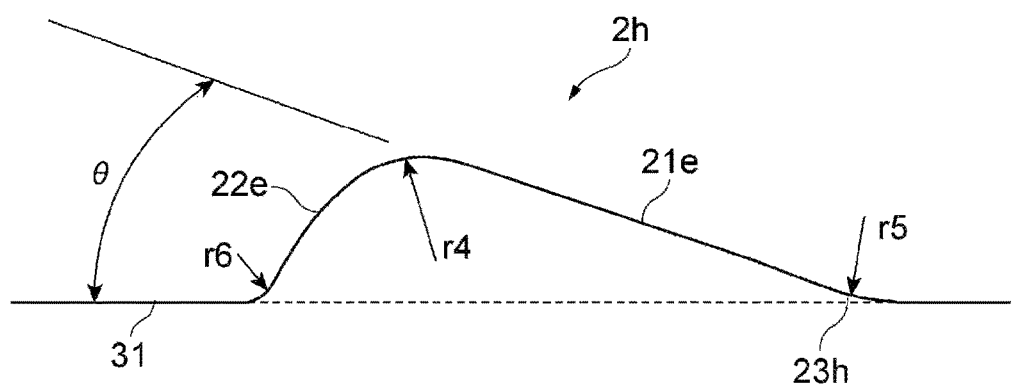

Next, an eighth variation example of the reflective portion will be described. Unlike the fifth variation example shown in FIG. 11A, the eighth variation example differs in that an R portion of a connecting surface 23h that connects to the first surface 31 is inversed. FIG. 11B is a schematic diagram of the reflective portion of the eighth variation example. As shown in FIG. 11B, in a reflective portion 2h, in the first direction, the connecting surfaces 22e and 23h composed of gentle curves are provided on both ends of the reflective main surface 21e in the first direction. The R portion of the connecting surface 23h is inversed and connected to the one surface 31. The connecting surface 23h is has an inversed R shape such as to have an extending tail in this manner. Therefore, when the embossed sheet is formed in a direction described hereafter, the flow of resin, plate peeling, and the like can be smoothly performed. Moldability can be improved.

Next, an array of the plurality of reflective portions 2 on the embossed sheet 1 and partial shifting in relation to the array will be described.

Figure 12:
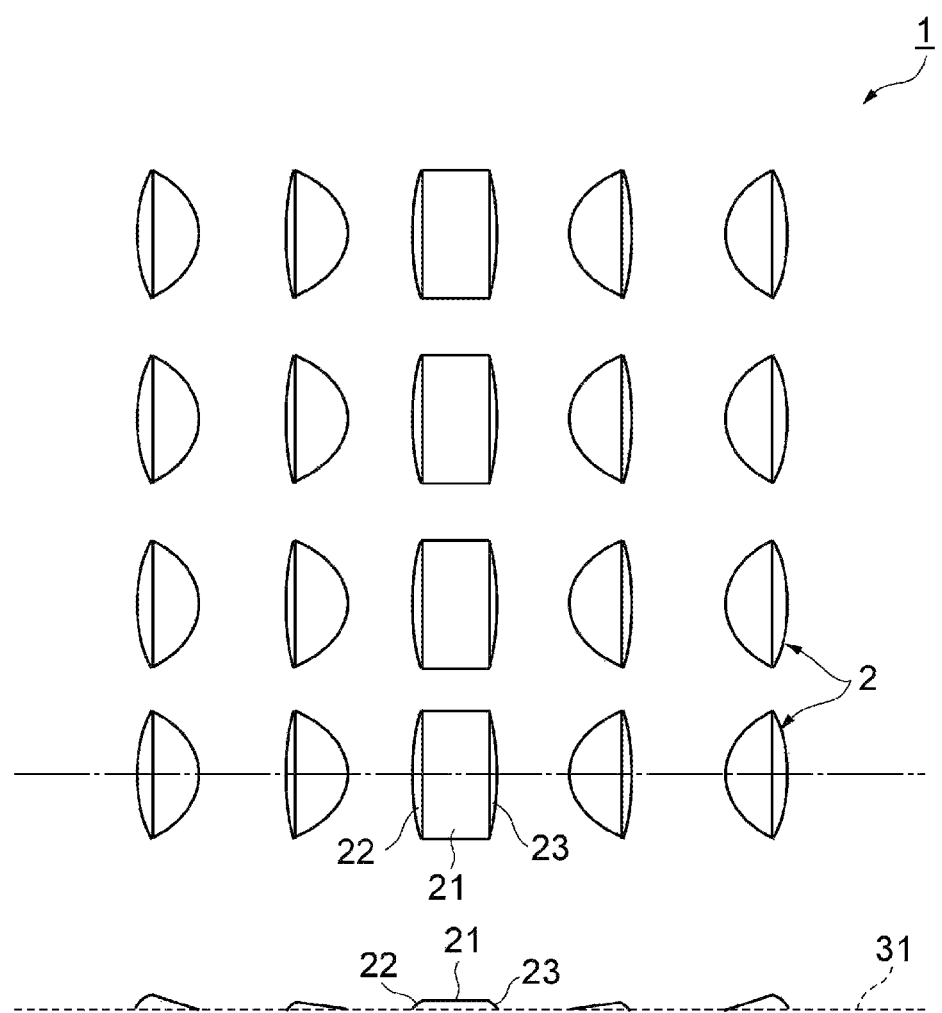
FIG. 12 is a schematic diagram of an example of an array of the reflective portions.

FIG. 12 is a schematic diagram of an array of the reflective portions 2. As shown in FIG. 12, in the embossed sheet 1, the gradient formed by a tangent line at the straight or curved portion at the center position of the reflective main surface 21 and the one surface 31 of the base 3 is such that the transition of the angle θ along the array of the plurality of reflective portions 2 in the first direction parallel to the first cross-section is greater in variation than the transition of the angle θ along the array of the plurality of reflective portions 2 in the second direction parallel to the second cross-section. In this case, the reflection of light can be given anisotropy by the array of the reflective portions 2. The anisotropy of scattering reflection can be expressed in the form of a line or a band. In FIG. 12, the embossed sheet 1 in which the gradient angle θ in the second direction is fixed and does not transition is shown as an example.

Figure 13:
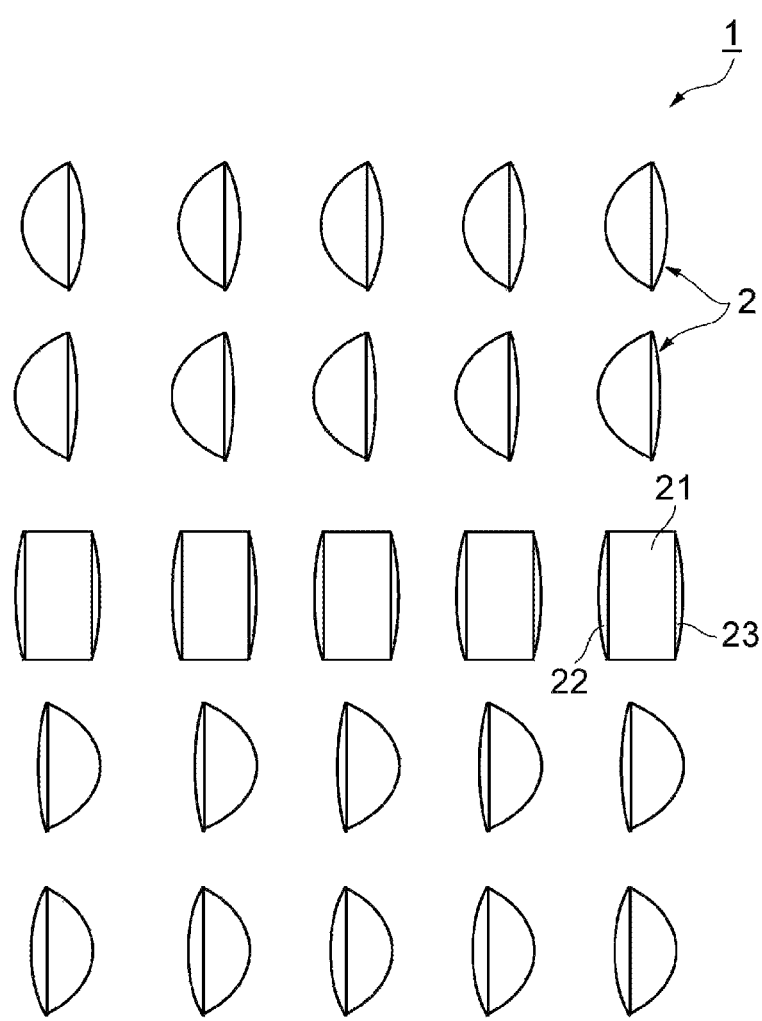
FIG. 13 is a schematic diagram of an example of another array of the reflective portions.

In addition, FIG. 13 is a schematic diagram of another array of the reflective portions. As shown in FIG. 13, in the embossed sheet 1, the gradient formed by a tangent line at the straight or curved portion at the center position of the reflective main surface 21 and the one surface 31 of the base 3 is such that the transition of the angle θ along the array of the plurality of reflective portions 2 in the second direction parallel to the second cross-section is greater in variation than the transition of the angle θ along the array of the plurality of reflective portions 2 in the first direction parallel to the first cross-section. In this case as well, the reflection of light can be given anisotropy by the array of the reflective portions 2. The anisotropy of scattering reflection can be expressed in the form of a line or a band. In FIG. 13, the embossed sheet 1 in which the gradient angle θ in the first direction is fixed and does not transition is shown as an example.

As described above, as a result of the reflective portion 2 itself being given the anisotropy of scattering reflection and the arrangement also being given anisotropy, the anisotropy of scattering reflection can be expressed in the form of a line or a band.

Figure 14:
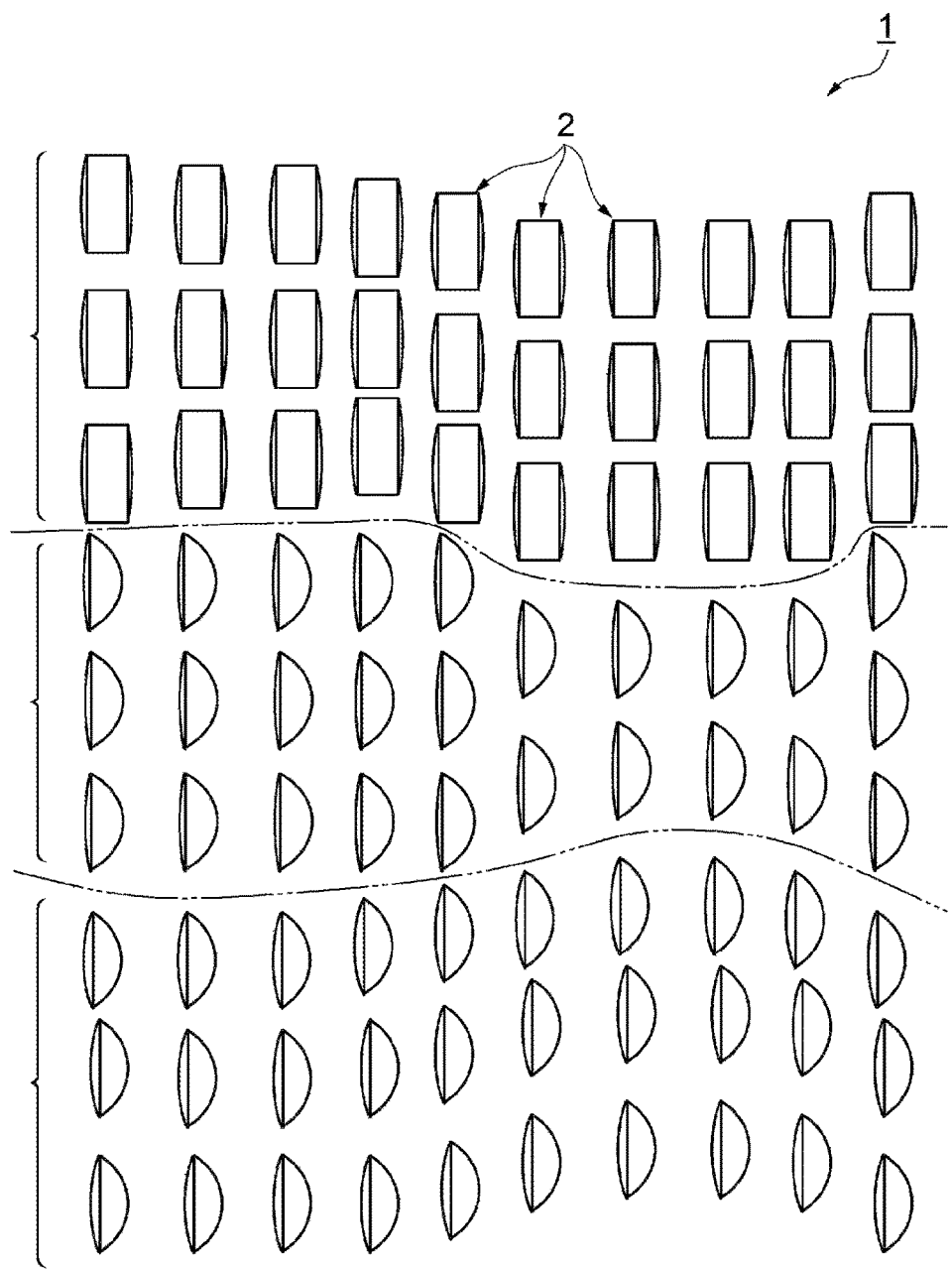
FIG. 14 is a schematic diagram of partial shifting in relation to the array of reflective portions.
Figure 15:
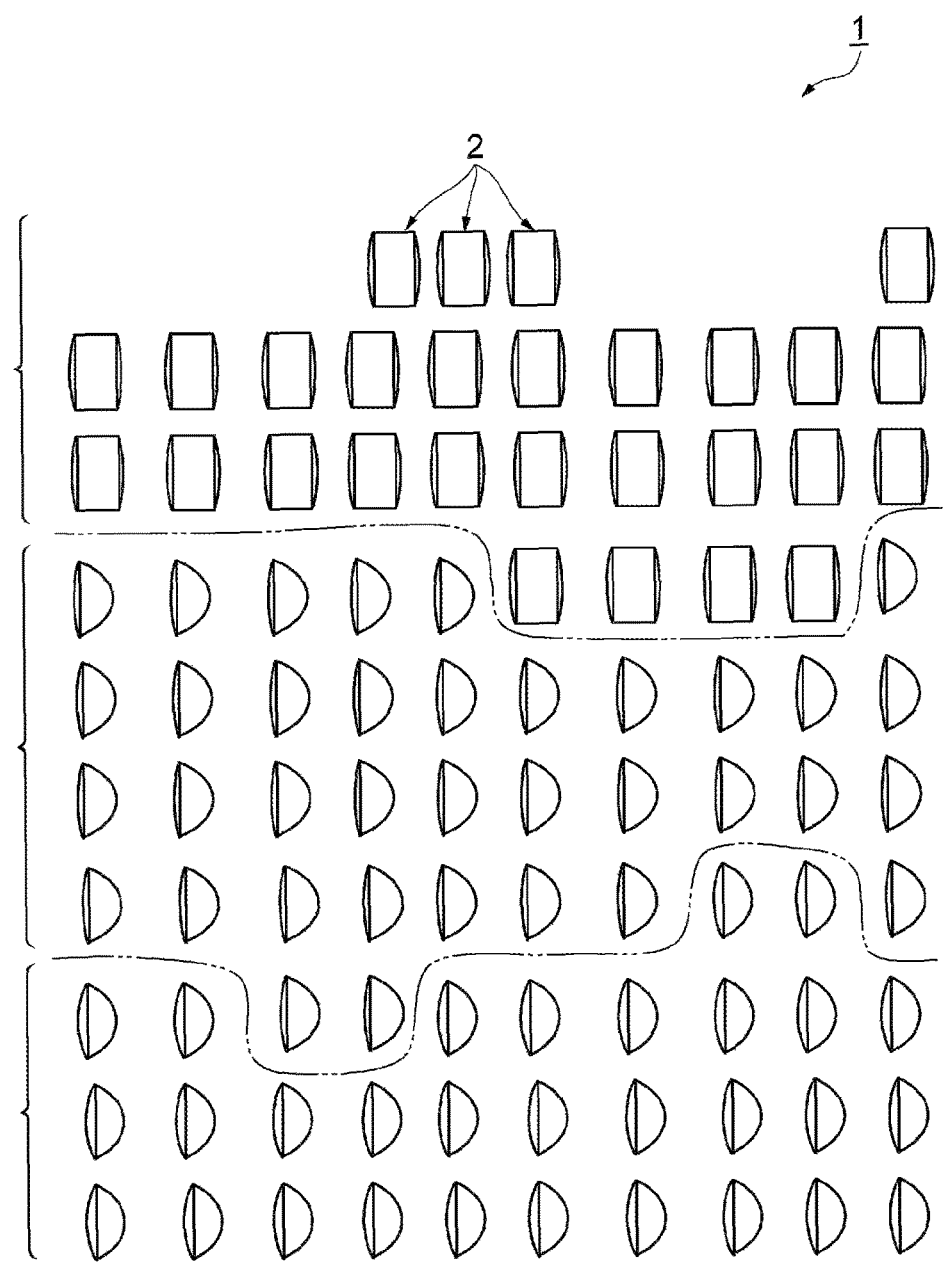
FIG. 15 is a schematic diagram of another partial shifting in relation to the array of reflective portions.

Next, an example of partial shifting in the embossed sheet 1 will be described with reference to FIG. 14 and FIG. 15. FIG. 14 is a schematic diagram of partial shifting in relation to the array of the reflective portions. FIG. 15 is a schematic diagram of another partial shifting in relation to the array of the reflective portions. As shown in FIG. 14, partial shifting in relation to the positions at which the plurality of reflective portions 2 are arranged may be added to the embossed sheet 1. Alternatively, as shown in FIG. 15, rather than partial shifting being added in relation to the positions at which the plurality of reflective portions 2 are arranged, partial shifting may be added to the arrays in the embossed sheet 1.

As described above, in the reflective portion 2 according to the present embodiment and the like, the gradient angle θ formed by the reflective main surface 21 of the reflective portion 2 and the like and the one surface 31 of the base 3 varies within the range of ±40 degrees in the first direction. For example, a transition of the angle θ, such as −35 degrees to −30 degrees, . . . −5 degrees to 0 degrees to +5 degrees to . . . +30 degrees to +35 degrees . . . , may be cyclically repeated. In addition, the transition of the gradient angle θ may be at a large pitch, such as by a pitch of 5 degrees as described above, but may also be at a small pitch of 1 degree or less. As the pitch becomes smaller, the changes in the angle at which the second reflection peak occurs become smoother when the angle of incidence of light and the observation position change. The movement of the site at which teri occurs becomes smooth and favorable. Meanwhile, as the pitch increases, the manufacturing process is simplified.

When the transition of the angle θ of the gradient along the array of the plurality of reflective portions 2 in the first direction is cyclic in this way, light is reflected over directions within a suitable angular range by the reflective main surface 21 in which the gradient angle θ cyclically transitions. Therefore, in the decorative sheet 5 using the embossed sheet 1, luster that has teri that appears in the wood-grain patterns of natural wood can be favorably reproduced, at least to an increased degree.

In a similar manner, the transition of the angle θ of the gradient formed by the reflective main surface 21 of the reflective portion 2 and the one surface 31 of the base 3 may be cyclically repeated in the second direction as well. When the transition of the angle θ of the gradient along the array of the plurality of reflective portions 2 in the second direction is cyclic in this way, light is reflected over directions within a suitable angular range by the reflective main surface 21 in which the gradient angle θ cyclically transitions. Therefore, in the decorative sheet 5 using the embossed sheet 1, luster that has teri that appears in the wood-grain patterns of natural wood can be favorably reproduced, at least to an increased degree.

The embossed sheet 1 may have a plurality of areas in which the plurality of reflective portions 2 are provided such that the gradient angle θ and the cycle at which the gradient angle θ transitions differ from one another. In this case, an area in which the reflected light is to be strongly expressed and an area in which the reflected light is to be weakly expressed can be set. As a result of the embossed sheet 1 being used in the decorative sheet 5, luster that has teri that appears in the wood-grain patterns of natural wood can be reproduced. That is, when the transition of the angle θ of the gradient formed by the reflective main surface 21 of the reflective portion 2 and the one surface 31 of the base 3 is cyclically repeated, a variation cycle may be configured by a single type of cycle, but may also be configured by two or more types of cycle. In addition, a variation range of the angle θ within a single cycle may be a single type, but may also be two or more types. For example, the configuration may be such that the width of a single cycle at a certain site is 50 nm and the variation in the angle θ is within a range of ±35 degrees, and the width of a single cycle at another site is 20 nm and the variation in the angle θ is within a range of ±20 degrees. In particular, in cases in which the plurality of reflective portions 2 are arranged in an array, the angle θ preferably continuously varies between differing cycles.

In addition, the transition of the angle θ of the gradient formed by the reflective main surface 21 of the reflective portion 2 and the one surface 31 of the base 3 may change the plurality of reflective portions 2 that are arranged in an array, one by one. However, the angle θ may transition with two or more reflective portions 2 as a single unit. For example, with ten reflective portions 2 arranged in an array in the first direction as a single unit, within the single unit, the angle θ of the gradient formed by the reflective main surface 21 and the one surface 31 may be fixed. When the above-described partial shifting is added to the array, the number of reflective portions 2 in a single unit may be varied (see FIG. 14 and FIG. 15).

Next, an example of a manufacturing method of the embossed sheet 1 will be described.

The embossed sheet 1 can be molded such that the base 3 and the reflective portions 2 are integrated, by an extrusion molding method, an injection molding method, or a hot-press molding method using, for example, a plate in which recess portions corresponding to the reflective portions 2 are cut. The resin to be used is not particularly limited. For example, polyethylene terephthalate (PET), polyethylene-2, 6-naphthalate, polypropylene terephthalate, polybutylene terephthalate, a polyester-type resin such as cyclohexane dimethanol copolymer polyester resin, isophthalic copolymer polyester resin, sporo glycol copolyester resin, or fluorine copolymer polyester resin, polyethylene, polypropylene (homopolymer, random copolymer, and block copolymer), polymethylpentene, a polyolefin-type resin such as alicyclic olefin copolymer resin, an acrylic resin such as polymethyl methacrylate, polycarbonate, polystyrene, polyamide, polyether, polyester amide, polyether ester, polyvinyl chloride, cycloolefin polymer, polyacrylonitrile copolymer, acrylonitrile styrene copolymer, a copolymer including the foregoing as a component, or a mixture of these resins can be used. For example, an ultraviolet absorber, a light stabilizer, and the like may be added. Alternatively, after the base 3 is molded by the extrusion molding method or the injection molding method using the above-described thermoplastic resin, the reflective portions 2 may be formed by a hot-press method, an ultraviolet curing molding method, an electron-beam curing molding method, or the like, using a plate for forming the reflective portions 2.

As described above, in the decorative sheet 5 including the embossed sheet 1, in the plurality of reflective portions 2 provided on the base 3, each reflective main surface 21 has a rectilinear shape or a gentle curvilinear shape on the first cross-section. In each of the plurality of reflective portions 2, the gradient of the tangent line at the straight or curved portion at the center position of the reflective main surface 21 in relation to the one surface 31 varies within the range of ±40 degrees. As a result of the reflective main surfaces 21 of which the gradient differs in this way, reflected light can be reflected at angles that are different from the regular reflection angle at the one surface 31 of the base 3. In addition, light is reflected over directions within a suitable angular range. Therefore, teri that appears in wood-grain patterns can be reproduced, at least to in increased degree. In addition, the gradient varies within the range of ±40 degrees. Therefore, light can also be reflected in directions within an angular range that is often actually visible. Furthermore, because each reflective main surface 21 has a curvilinear shape on the second cross-section, scattering-reflected light that does not have a specific reflection peak can also be achieved. Moreover, the base 3 has translucency. Therefore, as a result of the printed surface 4 of the wood-grain pattern being arranged on the side of the surface on which the reflective portions 2 are not provided, a realistic wood-grain texture can be expressed. In addition, the printed surface 4 can be protected from degradation. In particular, as a result of the wood-grain pattern of the printed surface 4 and the wood-grain direction of the present embossed sheet 1 being aligned, the effect of expressing a realistic wood-grain texture is further enhanced. As a result of the above, luster that has teri that appears in the wood-grain patterns of natural wood can be favorably reproduced by the decorative sheet 5 according to the present embodiment.

The present invention is not limited to the above-described embodiment. For example, a recessed portion or a protruding portion (not shown) that expresses a conducting vessel may be provided in the embossed sheet 1, in addition to the above-described reflective portions 2. In this case, a more realistic wood-grain texture can be expressed. In addition, an overcoat layer (not shown) may be further provided on the surface of the embossed sheet 1. The material of the overcoat layer is not particularly limited. For example, a resin obtained by an isocyanate being mixed with a polyester polyol, to which an ultraviolet absorber, a light stabilizer, and the like is added, can be used. Furthermore, although the wood-grain pattern is used as the printed surface 4 in the above-described configuration, the printed surface 4 is not limited thereto. An arbitrary design may be used. In this case, the impression of teri can be imparted, not only to decorative sheets, but also to packaging materials such as standup pouches filled with liquid, powder, solids, such as food products, beverages, and toiletry products, packaging paper, packaging boxes, pouches with built-in plug, laminated tubes, and bag-in-boxes. The designs of packaging materials can be improved.

EXAMPLES

The present invention will be described in further detail, below, based on examples and comparative examples. However, the present invention is not limited to the examples below.

First, to verify the effects of the present embodiment, the embossed sheet 1 and the decorative sheet 5 such as those below were prepared.

The reflective portion 2 of the prepared embossed sheet 1 is configured to include the reflective main surface 21 and the connecting surfaces 22 and 23 on the first cross-section. The reflective main surface 21 is curved. Angles formed by a straight line connecting two end points and tangent lines at the two end points are respectively 10 degrees. The length of the straight line connecting the two end points is 50 μm. The connecting surfaces 22 and 23 are circular arc-shaped (see FIG. 5). When the angle θ formed by the tangent at the curved portion at the center position of the reflective main surface 21 and the one surface 31 of the base 3 is 0 degrees, the angle formed by the tangent lines at the connection points between the connecting surfaces 22 and 23 and the reflective main surface 21 and the one surface 31 of the base 3 is 10 degrees. The tangent line at the other point on the circular arc and the one surface 31 of the base 3 is 50 degrees. Further towards the base 3 side than the other point is a straight line of which the angle formed with the one surface 31 of the base 3 is 50 degrees (see FIG. 5).

The overall reflective portion 2 of the prepared embossed sheet 1 has a circular arc shape on the second cross-section. An angle formed by a tangent line at a point in contact with the one surface 31 of the base 3 with the one surface 31 of the base 3 is 25 degrees.

In the embossed sheet 1 of the present example, the plurality of reflective portions 2 configured as described above is arranged such as to be arrayed in the following manner. That is, the angle θ formed by the tangent line at the center position of the reflective main surface 21 and the one surface 31 of the base 3 transitions such as to vary at a pitch of 5 degrees over a range of ±30 degrees, along the array of the plurality of reflective portions 2 in the second direction. In addition, the arrangement is that in which the plurality of reflective portions 2 are arrayed such that the width of the cycle of the transition, described above, changes in the following sequence. Specifically, the sequence is 10 mm, 8 mm, 3 mm, 6 mm, 10 mm, 6 mm, 3 mm, 8 mm, 10 mm, 8 mm, 3 mm, 6 mm, 10 mm, 6 mm, and 3 mm. The overall width is 100 mm. Meanwhile, in the array of the plurality of reflective portions 2 in the first direction, the reflective portions 2 are arranged in an array at a fixed pitch. The area ratio of the reflective portions 2 is 30%.

In addition, sandblasting treatment was performed on the mold used to mold the embossed sheet 1 such as that above. The surface roughness of the flat surface for transferring the one surface 31 of the base 3 is about 2 μm. Furthermore, a pattern for transferring a recessed portion expressing a conducting vessel was also formed in the mold.

As a comparison example, a mold on which a similar sandblasting treatment is performed on the flat mold and the pattern for transferring the recessed portion expressing a conducting vessel is formed was prepared.

In the above-described example and comparison example, the embossed sheet 1 was molded with resin having translucency, using the above-described two molds, on the sheet-shaped lower layer base 6 on which a wood-grain pattern has been printed. As a result, the decorative sheet 5 having an embossed surface and a decorative sheet of the comparison example were obtained.

In the decorative sheet 5 of the example, a visual expression was achieved in which a band-shaped luminescent line is visible under lighting and the band-shaped luminescent line moves when the viewing angle and the angle of the decorative sheet 5 are changed. Meanwhile, in the decorative sheet of the comparative example, a luminescent line such as that described above is not formed. Based on a comparison of the two, it was confirmed that a luster that has teri that appears in the wood-grain patterns of natural wood can be reproduced in the decorative sheet 5 of the example.

INDUSTRIAL APPLICABILITY

The present invention provides an embossed sheet that is capable of reproducing luster that has teri that appears in the wood-grain patterns of natural wood, and a decorative sheet including the embossed sheet.

REFERENCE SIGNS LIST

1: Embossed sheet
2, 2a to 2h: Reflective portion
21, 21a to 21e: Reflective main surface
22, 22b, 22e to 22g: Connecting surface
23, 23e to 23h: Connecting surface
3: Base
31: One surface
4: Printed surface
5: Decorative sheet
6: Lower layer base

What is claimed is:

1. An embossed sheet comprising:
a sheet-shaped base that has translucency; and
a plurality of reflective portions that are provided on one surface of the base, wherein
each of the plurality of reflective portions has a reflective main surface that reflects incident light and at least one connecting surface that is provided between the reflective main surface and the base,
each reflective main surface includes a rectilinear portion or a curvilinear portion on a first cross-section perpendicular to the one surface, and a rectilinear portion or a curvilinear portion on a second cross-section intersecting with the one surface and the first cross-section, and
a gradient of a tangent line at a rectilinear or curvilinear portion at a center position of the reflective main surface including the rectilinear portion or the curvilinear portion on the first cross-section in relation to the one surface varies within a range of −40 degrees or more and 40 degrees or less in each of the plurality of reflective portions,
wherein the gradient is (a) such that a transition of angle along an array of the plurality of reflective portions in a direction parallel to the first cross-section is greater in variation than a transition of angle along an array of the plurality of reflective portions in a direction parallel to the second cross-section or (b) such that a transition of angle along an array of the plurality of reflective portions in a direction parallel to the second cross-section is greater in variation than a transition of angle along an array of the plurality of reflective portions in a direction parallel to the first cross-section.

2. The embossed sheet of claim 1, wherein:
the connecting surface is such that a region connecting to the reflective main surface has a circular arc shape on the first cross-section.

3. The embossed sheet of claim 1, wherein:
the connecting surface is such that a region connecting to the one surface has a rectilinear shape on the first cross-section.

4. The embossed sheet of claim 1, wherein:
the connecting surface is provided on only one end side of the reflective main surface on the first cross-section.

5. The embossed sheet of claim 1, wherein:
each reflective main surface has a gentle curvilinear shape in which tangent lines at two arbitrary points on the reflective main surface form an angle with each other of 0 degrees or more and 40 degrees or less on the first cross-section.

6. The embossed sheet of claim 1, wherein:
the reflective main surface has a rectilinear shape on the first cross-section and a curvilinear shape on the second cross-section.

7. The embossed sheet of claim 1, wherein:
a total area ratio occupied by the reflective main surfaces in relation to the one surface of the base is 1% or more and 70% or less.

8. The embossed sheet of claim 1, wherein:
the gradient is such that a transition of angle along an array of the plurality of reflective portions in a direction parallel to the first cross-section is greater in variation than a transition of angle along an array of the plurality of reflective portions in a direction parallel to the second cross-section.

9. The embossed sheet of claim 8, wherein:
the gradient is such that the transition of angle along the array of the plurality of reflective portions in the direction parallel to the first cross-section is cyclic.

10. The embossed sheet of claim 1, wherein:
the gradient is such that a transition of angle along an array of the plurality of reflective portions in a direction parallel to the second cross-section is greater in variation than a transition of angle along an array of the plurality of reflective portions in a direction parallel to the first cross-section.

11. The embossed sheet of claim 10, wherein:
the gradient is such that the transition of angle along the array of the plurality of reflective portions in the direction parallel to the second cross-section is cyclic.

12. The embossed sheet of claim 11, wherein:
a plurality of areas are provided in which the plurality of reflective portions are provided such that the angle of the gradient and a cycle at which the angle of the gradient transitions differ from each other.

13. The embossed sheet of claim 1, wherein:
a surface roughness Ra of at least either of the surfaces of the plurality of reflective portions and the one surface is 0.01 µm or more and 20 µm or less.

14. The embossed sheet of claim 1, wherein:
each of the plurality of reflective portions has a protruding shape or a recessed shape.

15. A decorative sheet comprising:
an embossed sheet of claim 1.

* * * * *